United States Patent
Bojjanapalli et al.

(10) Patent No.: US 12,427,949 B2
(45) Date of Patent: Sep. 30, 2025

(54) DYNAMIC POSITION FEEDBACK FOR WIPER CONTROL

(71) Applicant: Rosemount Aerospace Inc., Burnsville, MN (US)

(72) Inventors: Muralidhar Rao Bojjanapalli, Hyderabad (IN); Raghavendra Venkataramu, Bangalore (IN)

(73) Assignee: Rosemount Aerospace Inc., Burnsville, MN (US)

( * ) Notice: Subject to any disclaimer, the term of this patent is extended or adjusted under 35 U.S.C. 154(b) by 147 days.

(21) Appl. No.: 18/239,785

(22) Filed: Aug. 30, 2023

(65) Prior Publication Data

US 2024/0308469 A1  Sep. 19, 2024

(30) Foreign Application Priority Data

Mar. 17, 2023  (IN) .............................. 202341018248

(51) Int. Cl.
*B60S 1/08*  (2006.01)
*B64C 1/14*  (2006.01)

(52) U.S. Cl.
CPC .............. *B60S 1/0807* (2013.01); *B64C 1/14* (2013.01)

(58) Field of Classification Search
CPC ........ B60S 1/0807; B60S 1/08; B60S 1/0896; B60S 1/3443; B60S 1/583
See application file for complete search history.

(56) References Cited

U.S. PATENT DOCUMENTS

| | | | | |
|---|---|---|---|---|
| 3,593,090 A * | 7/1971 | Kearns | .................... | B60S 1/482 318/444 |
| 5,969,431 A * | 10/1999 | Miller | ....................... | B60S 1/26 307/10.1 |
| 6,107,766 A | 8/2000 | Amagasa | | |
| 6,944,906 B2 * | 9/2005 | Moein | .................. | H02K 11/215 318/443 |
| 9,403,508 B2 | 8/2016 | Amagasa | | |
| 10,336,300 B2 * | 7/2019 | Ijima | ........................ | B60S 1/08 |
| 11,420,594 B2 | 8/2022 | Vadgaonkar et al. | | |
| 11,613,233 B2 * | 3/2023 | Srinivas | .................. | B60S 1/163 15/250.001 |
| 2013/0119911 A1 * | 5/2013 | Karcher | .................... | B60S 1/08 318/474 |

(Continued)

FOREIGN PATENT DOCUMENTS

| EP | 2683579 A1 | 1/2014 |
|---|---|---|
| EP | 3450267 A1 | 3/2019 |

OTHER PUBLICATIONS

European Search Report received in EP Application No. 24163381, Jul. 29, 2024, 9 pages.

*Primary Examiner* — Thai T Dinh
(74) *Attorney, Agent, or Firm* — Suiter Swantz IP (57) ABSTRACT

In accordance with at least one aspect of this disclosure, a system include, a wiper arm configured to sweep along a sweep zone defined between a start position and an end sweep position. A wiper drive shaft is operatively connected at a proximal end to the wiper arm to drive the wiper arm between the start position and the end sweep position. At least an angular encoder is operatively connected to a distal end of the wiper drive shaft configured to record an actual position of the wiper arm. A controller is operatively connected to the encoder to receive positon wiper arm position data therefrom.

10 Claims, 5 Drawing Sheets

(56) References Cited

U.S. PATENT DOCUMENTS

| | | |
|---|---|---|
| 2018/0370491 A1 | 12/2018 | Brown et al. |
| 2021/0016746 A1* | 1/2021 | Bojjanapalli ......... B60S 1/0807 |
| 2022/0234542 A1* | 7/2022 | Srinivas ................ B60S 1/0822 |

* cited by examiner

DYNAMIC POSITION FEEDBACK FOR WIPER CONTROL

CROSS-REFERENCE TO RELATED APPLICATIONS

This application claims priority to Indian Provisional Patent Application No. 202341018248, filed Mar. 17, 2023, the entire content of which is incorporated herein by reference.

TECHNICAL FIELD

The present disclosure relates to wiper control, e.g., for vehicles, and more particularly to dynamic position feedback for wiper control.

BACKGROUND

In a typical wiper control scheme, the wiper arm starts a sweep angle form a reference start position. This sweeping starts assuming that the wiper arm is at a park position. In the event of power failure, wiper arm may take an arbitrary position, anywhere between the park position and the end of the sweep point. Thus, when the wiper is powered on after a sudden power failure, the wiper system may treat the random position as the reference start position and the sweep of the wiper arm may not be exactly covering the intended sweep area on windshield.

There is always a need in the art for improvements to wiper systems, and control thereof, e.g., in the aerospace industry. This disclosure provides a solution for this need.

SUMMARY

In accordance with at least one aspect of this disclosure, a system include, a wiper arm configured to sweep along a sweep zone defined between a start position and an end sweep position. A wiper drive shaft is operatively connected at a proximal end to the wiper arm to drive the wiper arm between the start position and the end sweep position. At least an angular encoder is operatively connected to a distal end of the wiper drive shaft configured to record an actual position of the wiper arm. A controller is operatively connected to the encoder to receive positon wiper arm position data therefrom.

In embodiments, the controller configured to, based at least in part on the wiper arm position data, perform a method, including at least, controlling movement of the wiper arm from a park position to the start position, controlling movement of the wiper arm between the start position to the end sweep position, and controlling movement of the wiper arm from a stop position to the park positon.

The angular encoder can be configured to record the park position during wiper calibration, and the controller can be configured to store a reference zero position as the park position. In embodiments, the encoder or a position sensor can be configured to record a first sweep zone reference position based a predefined sweep zone, and the controller can be configured to store the first sweep zone reference position as the start positon.

In embodiments, during a power failure or stoppage of the wiper arm during an active sweep, the angular encoder can be configured to record the actual position of the wiper arm as the stop position, and the controller can be configured to compare the stop position of the wiper arm with the start position and compare the stop position with the park position.

When power is restored to the system, if the stop position of the wiper arm does not match the park position, the controller can be configured to move the wiper arm from the stop position to the park position before moving the wiper arm between the start position and the end sweep position. At startup of the system, the controller can be configured to move the wiper arm from the park position to the start position before moving the wiper arm between the start position and the end sweep position.

The system can further include a motor having a motor drive shaft operatively connected to the wiper drive shaft to drive the wiper arm via the wiper drive shaft. The motor drive shaft can be operatively connected to the wiper drive shaft via a gear reducer.

In certain embodiments, a cam can be operatively connected to the distal end of the wiper arm drive shaft to mirror the position of the wiper arm and the positon sensor can be positioned adjacent to the cam to sense the position of the wiper arm via the cam. In certain embodiments, the position sensor can be a Hall Effect sensor.

In certain embodiments, the system can include a vehicle having a windshield and the wiper arm can be mounted to the vehicle configured to wipe the windshield. An area between the start position and the end sweep positon can define a sweep zone, and the sweep zone can be defined on the windshield based on a desired user viewing portion. In certain embodiments, the vehicle can include an aircraft and the desired user viewing portion can be a viewing portion based on a pilot view for a given aircraft. The controller can be configured to confine movement of the wiper arm within the sweep zone, e.g., to prevent the wiper arm from going beyond the end sweep position, or from defining a new sweep zone outside of the predetermined sweep zone.

In accordance with at least one aspect of this disclosure, a method can include, controlling movement of a wiper arm based at least in part on wiper arm position data received from an angular encoder operatively connected to the shaft of the wiper arm such that total displacement of the wiper arm is confined to a predetermined sweep zone defined between a start position and an end sweep position.

Controlling movement of the wiper arm can include, controlling movement of the wiper arm from a park position to the start position, controlling movement of the wiper arm between the start position and the end sweep position, and controlling movement of the wiper arm from a stop position to the park positon.

The method can include, recording the park position during wiper calibration, selecting the start position based on the predetermined sweep zone, storing in a memory a reference zero position as the park position and storing in the memory a first sweep zone reference position as the start positon.

In embodiments, the method can include, recording, during a power failure or stoppage of the wiper arm during an active sweep, an actual position of the wiper arm as the stop position, and comparing the stop position with the start position and comparing the stop position with the park position.

In embodiments, the method can include, when power is restored or when the wiper arm is restarted, if the stop position does not match the park position, controlling the wiper arm to move from the stop position to the park position before controlling the wiper arm to move between the start position and the end sweep position.

In embodiments, the method can include, when power is restored or when the wiper arm is restarted, if the stop position of the wiper arm does match the park position, controlling the wiper arm to ensure the park position before controlling the wiper arm to move between the start position and the end sweep position. If the wiper arm is not at the park position, the method can include controlling the wiper arm to move from the park position to the start position before controlling the wiper arm to move between the start position and the end sweep position.

In embodiments, the method can include, at startup, controlling the wiper arm to move from the park position to the start position before controlling the wiper arm to move between the start position and the end sweep position.

In accordance with at least one aspect of this disclosure, a non-transitory computer readable medium can include computer executable instructions stored therein. The computer executable instructions can be configured to cause a computer to perform a method. The method can include any embodiment of the method described herein, e.g., at least controlling movement of a wiper arm based at least in part on wiper arm position data received from an angular encoder operatively connected to the wiper arm such that total displacement of the wiper arm is confined to a predetermined sweep zone.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
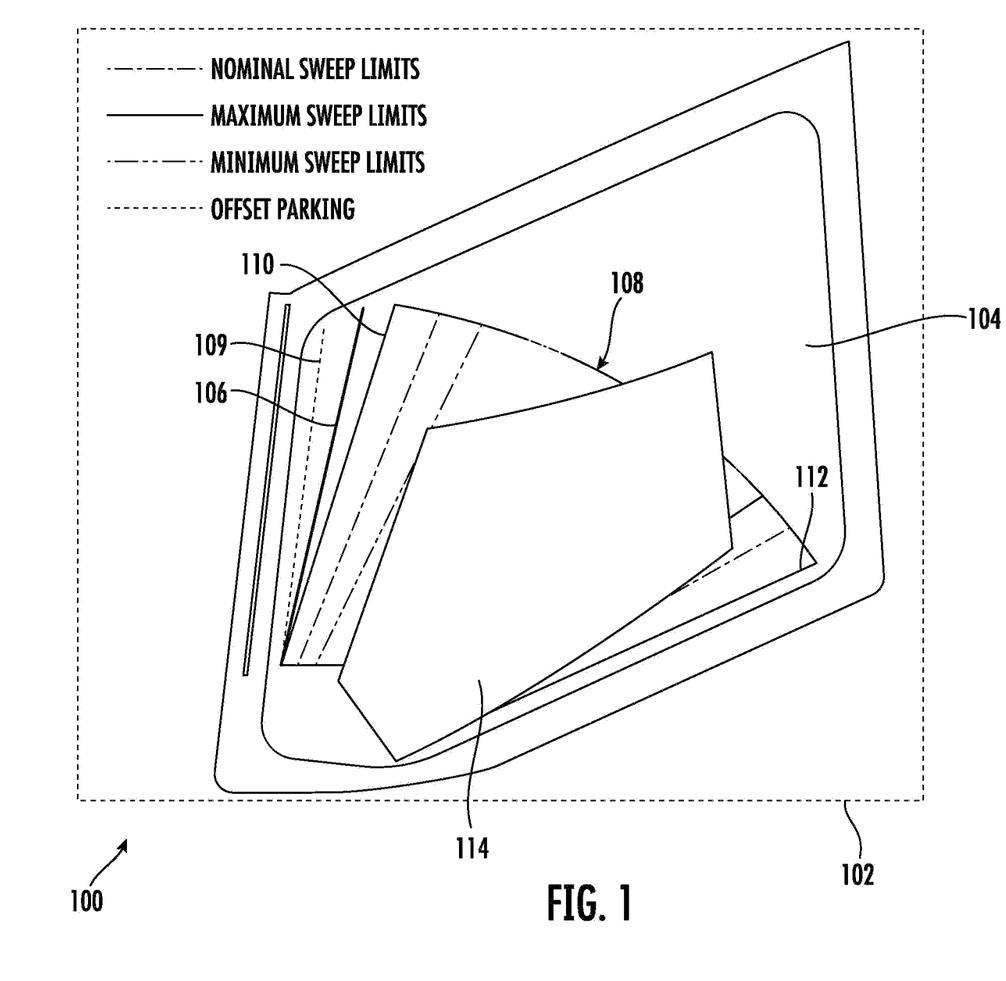
FIG. 1 is a schematic view of an embodiment of a wiper system in accordance with this disclosure, showing a sweep zone on a windshield.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-4.

Conventional windshield wiper technology does not provide a method to take actual positional feedback of the wiper arm on the windshield with respect to a reference zero position, if the wiper arm is stopped at a random position within the sweep zone (e.g., due to a sudden power failure or sudden turning off the system during an active sweep). This is because, typically, on the start of the wiper system, the system assumes that the last position of the wiper arm is the reference zero position, and starts from there, which can cause a shift in the sweeping zone. In accordance with at least one aspect of this disclosure, a system 100 is described to address this.

Referring to FIG. 1, the system 100 can include a vehicle 102 having a windshield 104 and at least one wiper arm 106 mounted to the vehicle 102 configured to wipe the windshield 104 along a sweep zone 108 defined between a start position 110 and an end sweep position 112. The sweep zone 108 can be defined on the windshield based on a desired user viewing portion 114. In certain embodiments, the vehicle 102 can include an aircraft and the desired user viewing portion 114 can be a viewing portion based on a pilot view for a given aircraft or as required by regulation for a given aircraft.

Figure 2:
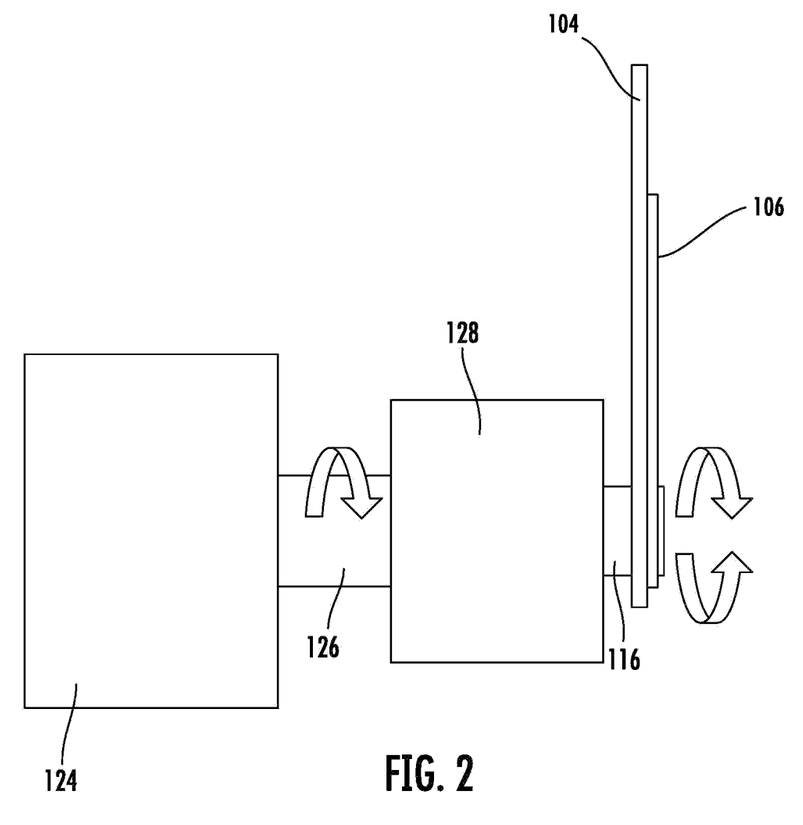
FIG. 2 is a schematic view of the system of FIG. 1; showing mechanical connection of the wiper system.
Figure 3:
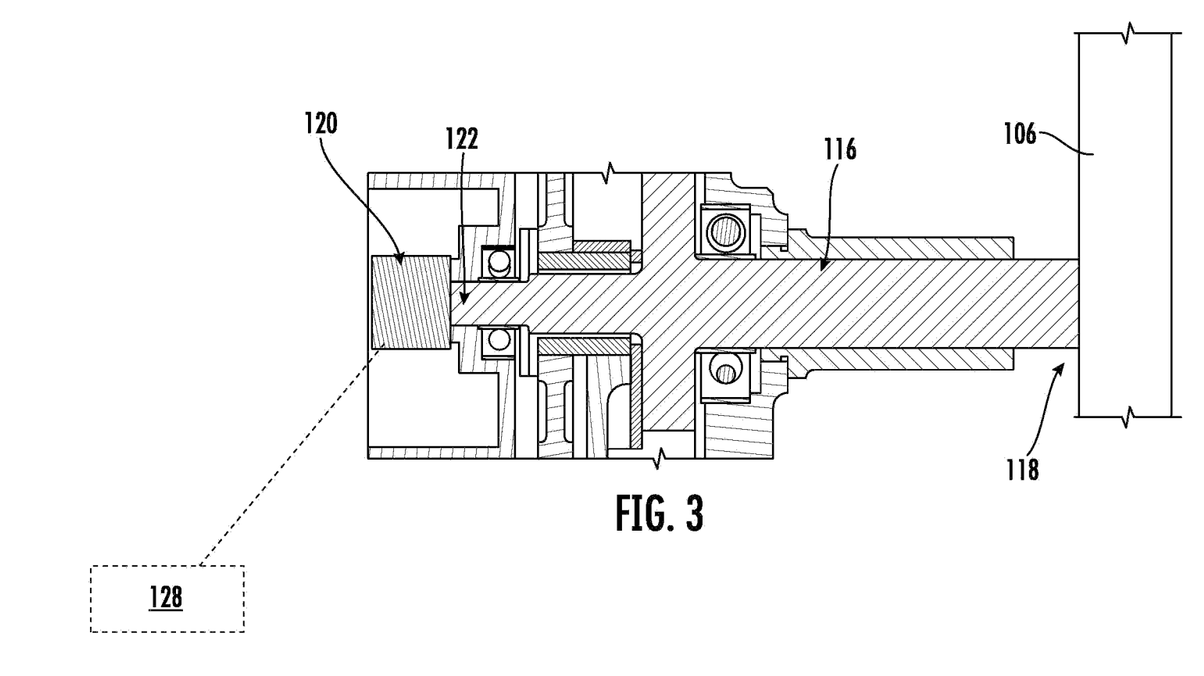
FIG. 3 is a partial cross sectional view of the mechanical connections of FIG. 2, showing.
Figure 3A:
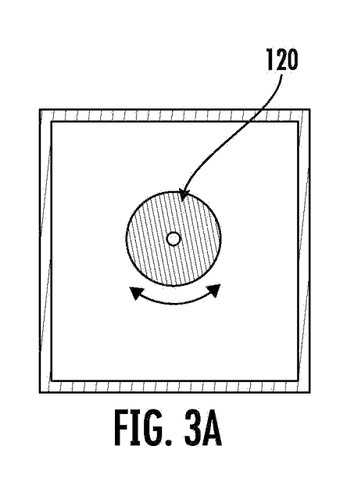
FIG. 3A is a rear view of the partial view of FIG. 3.
Figure 4:
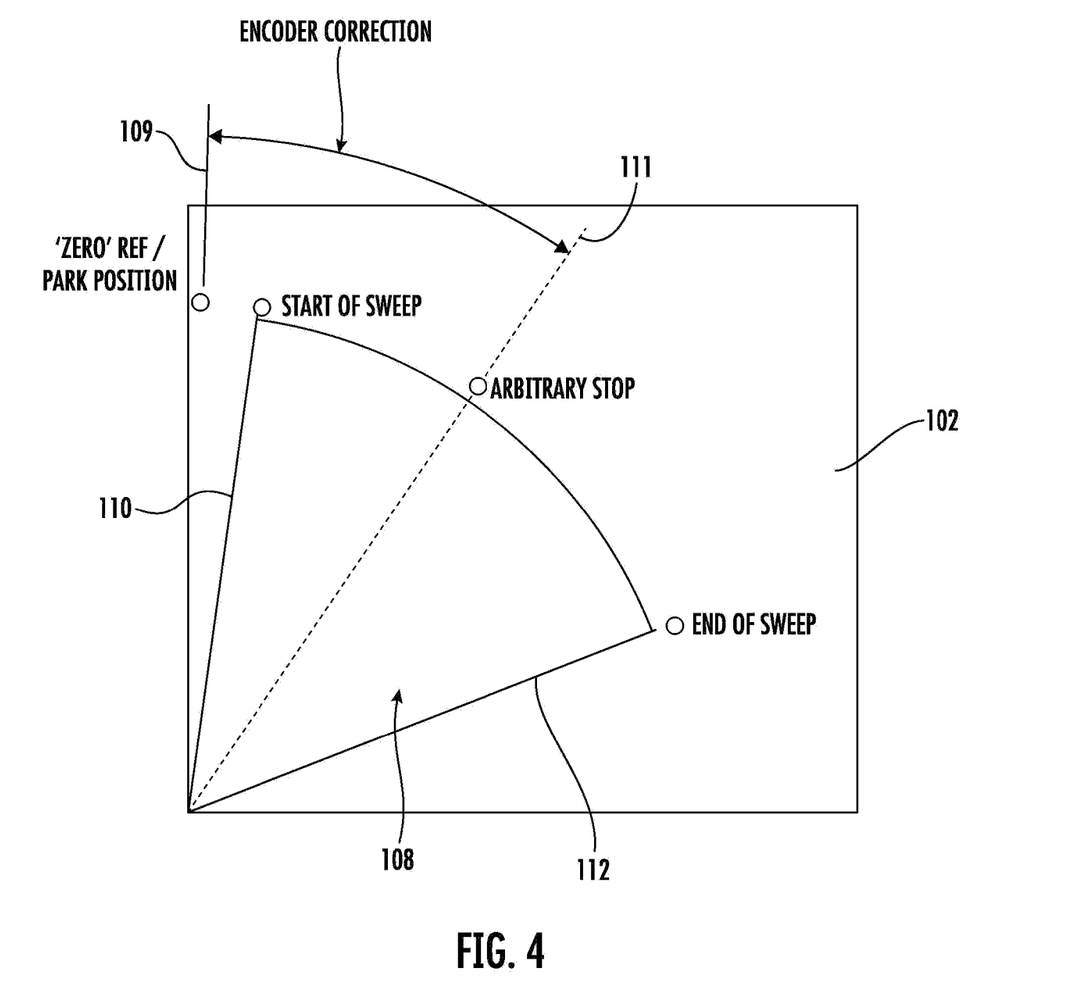
FIG. 4 is a schematic representation of a sweep zone.

With reference now to FIGS. 1-3, a wiper drive shaft 116 can be operatively connected to the wiper arm 106 at a proximal end 118 of the wiper drive shaft 116 to drive the wiper arm 106 between the start position 110 and the end sweep position 112. An angular encoder 120 can be operatively connected to a distal end 122 of the wiper drive shaft 116 configured to record an actual position of the wiper arm 106 as wiper arm position data. A motor 124 having a motor drive shaft 126 can be operatively connected to the wiper drive shaft 116 to drive the wiper arm 106 via the wiper drive shaft 116. The motor drive shaft 126 can be operatively connected to the wiper drive shaft 116 via a gear reducer 128. In certain embodiments, a cam can be operatively connected to the distal end 122 of the wiper arm drive shaft 116 to mirror the position of the wiper arm 106 on the windshield 102. A positon sensor can be positioned adjacent to the cam to sense the position of the wiper arm via the cam while the cam sweeps along the position sensor. In certain embodiments, the position sensor can be a Hall Effect sensor. In certain embodiments, the system 100 can include the angular encoder 120 in addition to the cam and position sensor. In certain embodiments, the angular encoder can be used to replace the cam and position sensor such that the system 100 does not include a cam and/or the position sensor.

A controller 128 is operatively connected to the encoder 120 and, if included, the positon sensor to receive wiper arm position data therefrom. The controller 128 can be configured to confine movement of the wiper arm 106 within the predetermined sweep zone 108, e.g., to prevent the wiper arm 106 from going beyond the end sweep position 112, and/or to prevent a new sweep zone from being defined outside of the predetermined sweep zone 108.

Figure 5:
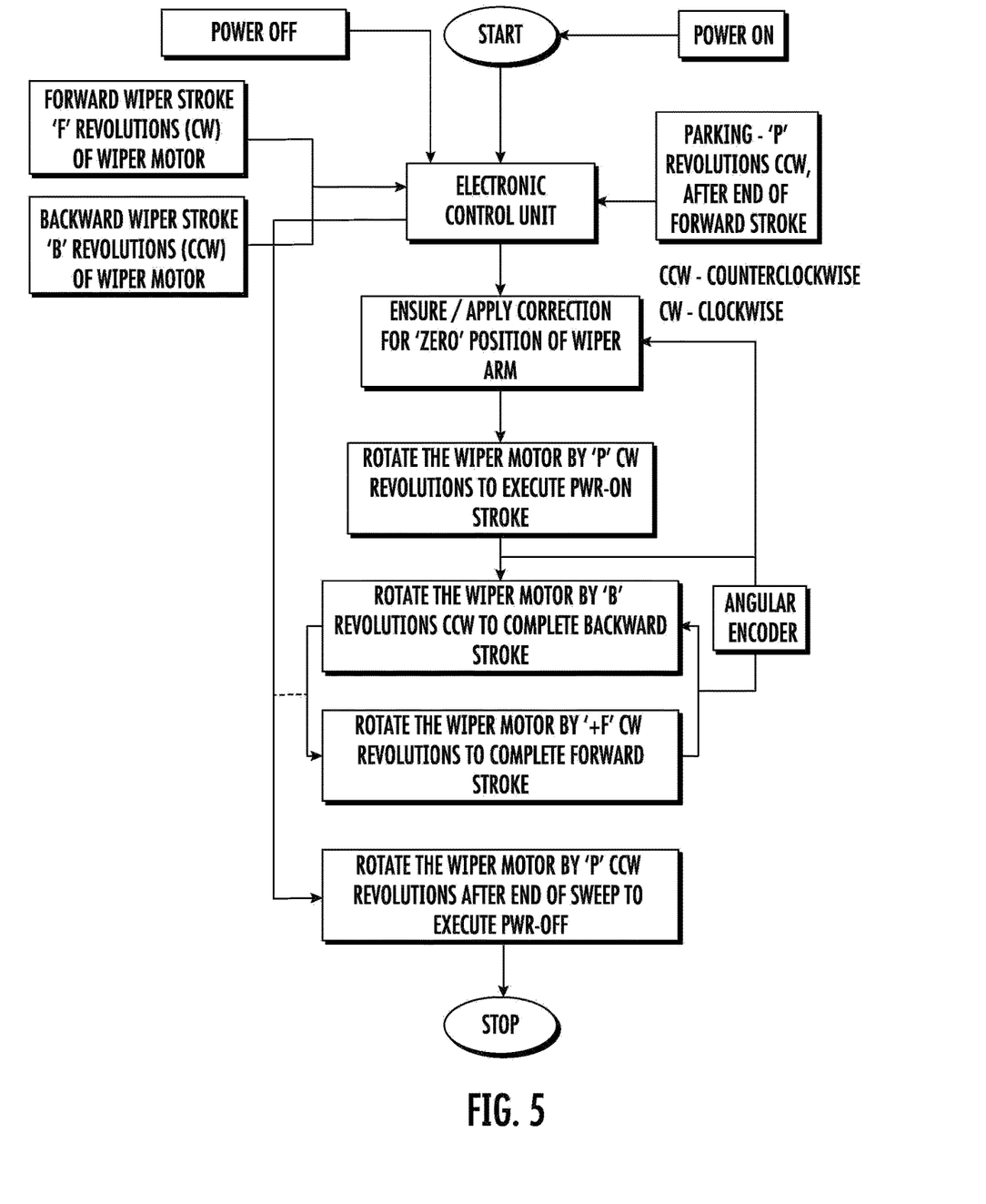
FIG. 5 is a flow chart of an embodiment of a method.

Referring now to FIGS. 4 and 5, in embodiments, the controller 128 can be configured to, based at least in part on the wiper arm position data, perform a method (e.g., as shown in FIG. 5). The method can include, at least, controlling movement of the wiper arm 106 from a park position 109 to the start position 110, controlling movement of the wiper arm 106 between the start position 110 and the end sweep position 112, and controlling movement of the wiper arm 106 from a stop position 111 to the park positon 109. The stop positon 111 can be a position of the wiper arm 106 between the start positon 110 and the stop position 112 when the system 100 experiences a power failure or the wiper arm 106 suddenly stops during an active sweep.

The method can include, recording (e.g., with the encoder 120) the park position 109 during wiper calibration and storing in a memory a reference zero position as the park position 109. The method can include selecting the start position 110 based on the predetermined sweep zone (e.g., based on the user or vehicle requirements) and storing in the memory a first sweep zone reference position as the start positon 110.

In embodiments, the method can include, recording (e.g., with the encoder 120), during a power failure or stoppage of the wiper arm 106 during an active sweep, an actual position of the wiper arm as the stop position 111, and comparing the stop position 111 with the start position 110 and comparing the stop position 111 with the park position 109.

When power is restored or when the wiper arm is restarted, if the stop position 111 does not match the park position 109 (e.g., as shown in FIG. 4), the method can include controlling the wiper arm 106 to move from the stop position 111 to the park position 109 before controlling the wiper arm 106 to move between the start position 110 and the end sweep position 112.

When power is restored or when the wiper arm 106 is restarted, if the stop position 111 does match the park position 109, the method can include controlling the wiper arm 106 to move from the park position to 109 the start position 110 before controlling the wiper arm 106 to move between the start position 110 and the end sweep position 112.

In embodiments, the method can include, at startup, controlling the wiper arm 106 to move from the park position 109 to the start position 110 before controlling the wiper arm 106 to move between the start position 110 and the end sweep position 112.

In accordance with at least one aspect of this disclosure, a non-transitory computer readable medium can include computer executable instructions stored therein. The computer executable instructions can be configured to cause a computer to perform a method. The method can include any embodiment of the method described herein, e.g., at least controlling movement of a wiper arm (e.g., wiper arm 106) based at least in part on wiper arm position data received from an angular encoder (e.g., encoder 120) operatively connected to the wiper arm such that total displacement of the wiper arm is confined to a predetermined sweep zone (e.g., sweep zone 108).

Embodiments include a windshield wiper system (e.g., system 100) integrated with wiper arm and blade on the windshield. When the wiper system is energized, it wipes the windshield, one each for pilot and copilot. The wiper arm can rotate back and forth in an arc, e.g., as shown in FIG. 1. In a traditional wiper system, sweep limits are defined through the rotational oscillatory limits of the wiper output shaft. During use, the sweep limits and the park position of the wiper arm can be controlled by software code (e.g., via the controller), which can control the angular limits of the output shaft rotation.

The wiper arm can be driven by a wiper motor through a gear reducer, e.g., so that multiple revolutions of the motor shaft are required to cover the required sweep angle (arc) of the wiper arm on the windshield. The gear reducer can provide greater flexibility to control the sweep angle accuracy. In certain embodiments, the rear end of the wiper output shaft can be fitted with a cam, and a hall sensor pcb assembly, to recognize the end of sweep and to synchronize the pilot and copilot wiper systems.

In typical systems, when the wiper is switched off, the controller is configured to move the wiper to the park/offset parking position and stop the wiper system. However, in certain instances, the wiper arm may not return to the part positon when turned off during a stroke. Then, when the wiper is switched on, the default parking position is taken as reference and accordingly the motor will operate to execute the wiping cycles within the prescribed limits. Therefore, on 'START', the wiper system executes the full forward and return stroke, considering that the wiper arm was determined to be at "PARKING', irrespective of actual position of wiper arm.

Hence an abrupt power failure to the wiper system may cause a random halt position of the wiper arm, anywhere between 'Parking' and 'end of Sweep' points which can cause the malfunctioning of wiper system by not operating in the prescribed sweep limits.

In embodiments of the system 100, the back end of the wiper arm output shaft can be used to get the actual position of the wiper on the wind shield with respect to the 'START/ PARK' reference positions. The angular encoder, the cam and the Hall sensor pcb can be mounted on the back end of the wiper output shaft, if the cam and Hall sensor are included. The cam can replicate the wiper arm position on wind shield, as it is mounted on the wiper shaft rear end. In embodiments the initial reset of START position can be done to the encoder using Hall sensor and the cam end-of sweep-signal. Therefore, positional feedback of wiper arm is taken with the help of encoder mounted on the wiper shaft and fed back to the controller for taking the wiper arm to the reference 'START' to start a fresh wiping cycle. This way, the shift in the sweeping zone can be avoided in case of any abrupt wiper arm stoppage.

In certain embodiments of the system 100, e.g., as described, the system 100 may not include a cam and/or Hall sensor, and the back end of the wiper arm output shaft is used to get the actual position of the wiper on the wind shield with respect to the 'START/PARK' reference position using the angular encoder mounted on the back end of the Wiper output shaft. The positional feedback is taken using the angular measurement from the encoder with respect to PARK position and fed back to the controller for taking the wiper arm to the reference 'START' to start a fresh Wiping cycle. This way, the shift in the sweeping zone is avoided in case of any abrupt stoppage. The sweep count and the synchronization of pilot and copilot systems can be done through the encoder data, and without the Hall sensor pcb assembly. The encoder can be a miniature precision angular/ rotary encoder used to measure the actual position of the arm assembly that is mounted onto output shaft.

In embodiments, during initial set-up of the system, the encoder is set-up for zero position for which the wiper shaft takes the exact position with respect to the installation, e.g., the part positon. Then, a "START" position is set, and the encoder provides angular feedback with respect to "START" position. This feedback signal is provided to the controller on the actual wiper arm position. Based on the position feedback from encoder, the required correction rotation can be made to bring back the wiper to the PARK position after power resumption to the wiper system, and thus eliminates the sweep zone shift.

In embodiments, the encoder can detect the actual position of the output shaft/arm assembly with 0.1° resolution accuracy (i.e., not only end positions any intermediate positions can be accurately measured). In embodiments, the controller can monitor the output shaft position using the encoder feedback, and the feedback can be sent to the controller to command the motor to sweep within the programed sweep limits.

In embodiments of the system 100, when the wiper system shuts-off abruptly during operation and the wiper arm takes an arbitrary position (e.g., the stop position 111) the encoder provides feedback to the control unit on how much the output shaft to rotate i.e., to command motor to rotate required number of turns to return the wiper arm to the PARK position. The system 100 allows for closed loop feedback to bring back the Wiper arm to the designated PARKING position after power resumption.

Embodiments of the encoder feedback to controller and can provide a closed loop control of the system, so that the wiper system can recognize any arbitrary intermediate positions with respect to the 'START/PARK' reference position i.e., during any abrupt shut-off. Accordingly, the problem of sweep zone shift can be addressed by sensing the wiper arm's actual position on the windshield and thus correcting the wiper position to PARK/ZERO Ref, after power resumption to the wiper system, e.g., as described herein.

Embodiments of the system can provide increased safety and reliability. Embodiments can be simple and easy to implement. Embodiments can avoid cumbersome reset of wiper limits and sweep zone calibration after power failure, if any. Embodiments can enable sweep zone accuracy of the order less than 0.5°.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "controller," or "system." A "circuit," "controller," or "system" can include one or more portions of one or more separate physical hardware and/or software components that can together perform the disclosed function of the "circuit," "controller," or "system", or a "circuit," "controller," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A method, comprising:
   controlling movement of a wiper arm based at least in part on wiper arm position data received from an angular encoder operatively connected to a shaft of the wiper arm such that total displacement of the wiper arm is confined to a predetermined sweep zone defined between a start position and an end sweep position, wherein controlling movement of the wiper arm includes:
      controlling movement of the wiper arm from a park position to the start position;
      controlling movement of the wiper arm between the start position and the end sweep position; and
      controlling movement of the wiper arm from a stop position to the park position;
   recording the park position during wiper calibration;
   selecting the start position based on the predetermined sweep zone;
   storing in a memory a reference zero position as the park position and storing in the memory a first sweep zone reference position as the start position;
   recording, during a power failure or stoppage of the wiper arm during an active sweep, an actual position of the wiper arm as the stop position; and
   comparing the stop position with the start position and comparing the stop position with the park position, wherein:
   when power is restored or when the wiper arm is restarted, if the stop position does not match the park position, controlling the wiper arm to move from the stop position to the park position before controlling the wiper arm to move between the start position and the end sweep position; or
   when power is restored or when the wiper arm is restarted, if the stop position of the wiper arm does match the park position, controlling the wiper arm to move from the park position to the start position before controlling the wiper arm to move between the start position and the end sweep position.

2. The method of claim 1, further comprising:
   at startup, controlling the wiper arm to move from the park position to the start position before controlling the wiper arm to move between the start position and the end sweep position.

3. A system, comprising,
   a wiper arm configured to sweep along a sweep zone defined between a start position and an end sweep position;
   a wiper drive shaft operatively connected at a proximal end to the wiper arm to drive the wiper arm between the start position and the end sweep position;
   an angular encoder operatively connected to a distal end of the wiper drive shaft configured to record an actual position of the wiper arm; and
   a controller operatively connected to the encoder to receive position wiper arm position data therefrom, the controller configured to, based at least in part on the wiper arm position data:
      control movement of the wiper arm from a park position to the start position;
      control movement of the wiper arm between the start position to the end sweep position; and
      control movement of the wiper arm from a stop position to the park position;
   wherein the angular encoder is configured to record the park position during wiper calibration,
   wherein the controller is configured to store a reference zero position as the park position;
   wherein the encoder is configured to record a first sweep zone reference position based a predefined sweep zone, wherein the controller is configured to store the first sweep zone reference position as the start position;
   wherein during a power failure or stoppage of the wiper arm during an active sweep, the angular encoder is configured to record the actual position of the wiper arm as the stop position;
   wherein the controller is configured to compare the stop position of the wiper arm with the start position and compare the stop position with the park position; and wherein:
   when power is restored or when the wiper arm is restarted, if the stop position does not match the park position, controlling the wiper arm to move from the stop position to the park position before controlling the wiper arm to move between the start position and the end sweep position; or when power is restored or when the wiper arm is restarted, if the stop position of the wiper arm does match the park position, controlling the wiper arm to move from the park position to the start position before controlling the wiper arm to move between the start position and the end sweep position.

4. The system of claim 3, wherein, at startup of the system, the controller is configured to move the wiper arm from the park position to the start position before moving the wiper arm between the start position and the end sweep position.

5. The system of claim 3, further comprising a motor having a motor drive shaft operatively connected to the wiper drive shaft to drive the wiper arm via the wiper drive shaft.

6. The system of claim 5, wherein the motor drive shaft is operatively connected to the wiper drive shaft via a gear reducer.

7. The system of claim 3, further comprising a vehicle having a windshield, the wiper arm mounted to the vehicle configured to wipe the windshield, wherein an area between the start position and the end sweep position defines a sweep zone, wherein the sweep zone is defined on the windshield based on a desired user viewing portion.

8. The system of claim 7, wherein the vehicle is an aircraft.

9. The system of claim 3, wherein an area between the start position and the end sweep position defines a sweep zone, wherein the sweep zone is defined on a windshield based on a desired user viewing portion, wherein the controller is configured to confine movement of the wiper arm within the sweep zone.

10. A non-transitory computer readable medium having computer executable instructions stored therein, the computer executable instructions configured to cause a computer to perform a method, the method comprising:

controlling movement of a wiper arm based at least in part on wiper arm position data received from an angular encoder operatively connected to the wiper arm such that total displacement of the wiper arm is confined to a predetermined sweep zone, wherein controlling movement of the wiper arm includes:

controlling movement of the wiper arm from a park position to a start position;

controlling movement of the wiper arm between the start position and an end sweep position; and controlling movement of the wiper arm from a stop position to the park position recording the park position of the wiper arm during wiper calibration;

selecting a start position of the wiper arm based on the predetermined sweep zone;

storing in a memory a reference zero position as the park position of the wiper arm and storing in the memory a first sweep zone reference position as the start position;

controlling the wiper arm such that at start up the wiper arm is moved from the park position to the start position before moving the wiper arm between the start position and the end sweep position;

recording, during a power failure or stoppage of the wiper arm during an active sweep, an actual position of the wiper arm as the stop position of the wiper arm; and comparing the stop position of the wiper arm with the start position and comparing the stop position with the park position, wherein:

when power is restored or when the wiper arm is restarted, if the stop position of the wiper arm does not match the park position, controlling the wiper arm to move from the stop position to the park position before controlling the wiper arm to move between the start position and the end sweep position; or when power is restored or when the wiper arm is restarted, if the stop position of the wiper arm does match the park position, controlling the wiper arm to move from the park position to the start position before controlling the wiper arm to move between the start position and the end sweep position.

* * * * *